Dec. 5, 1939.　　　G. C. DAVIS　　　2,182,469
FLOAT BOX
Filed Oct. 24, 1938　　　2 Sheets-Sheet 1

Inventor.
George C. Davis.
by Parker Carter
Attorneys.

Dec. 5, 1939.  G. C. DAVIS  2,182,469
FLOAT BOX
Filed Oct. 24, 1938  2 Sheets-Sheet 2
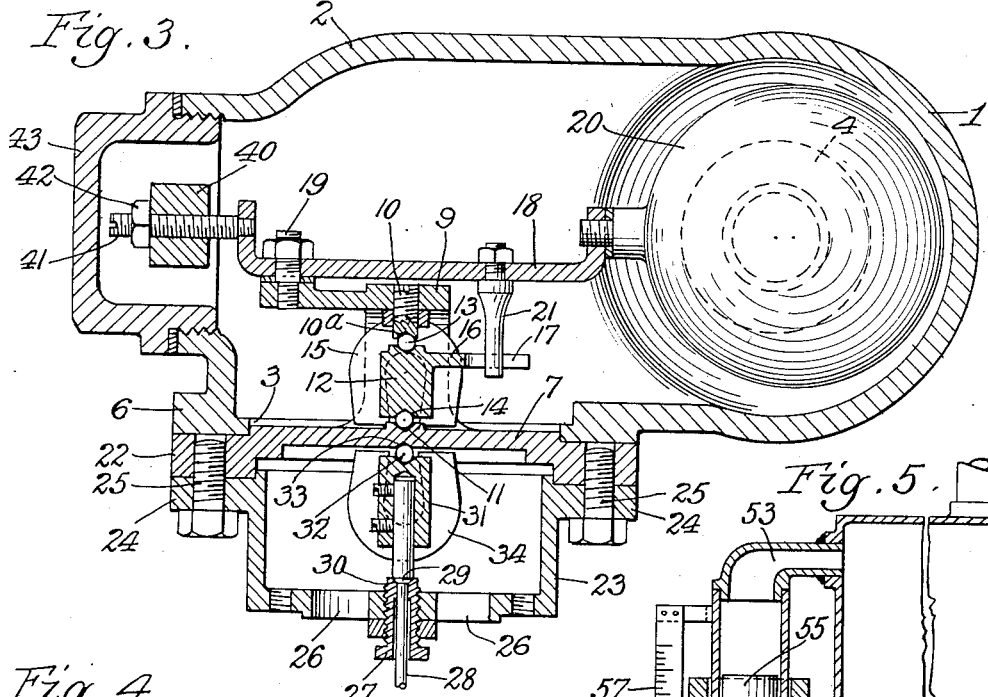
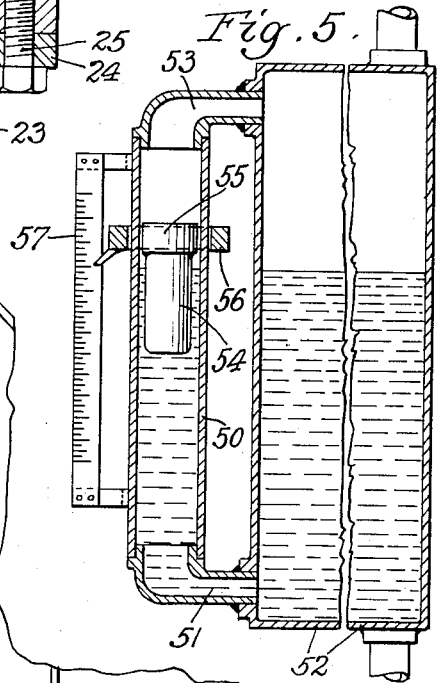
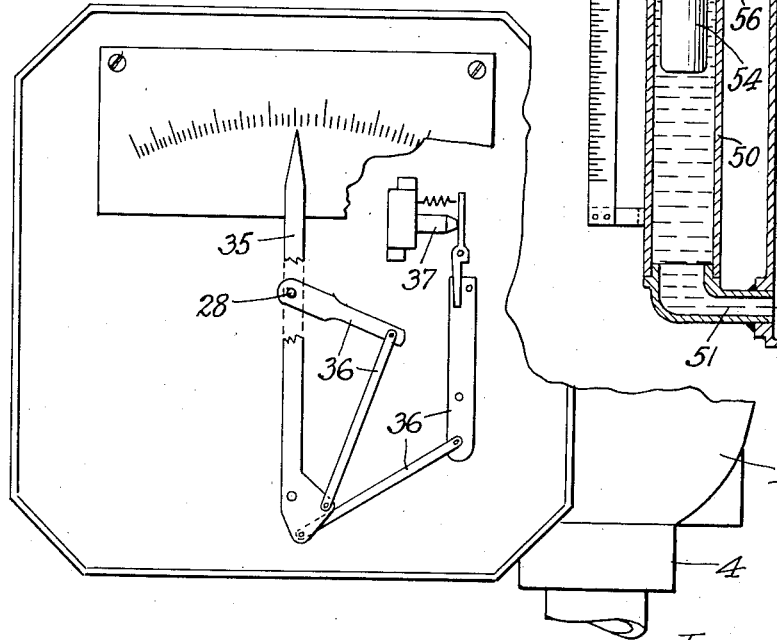
Inventor
George C. Davis.
by Parker & Carter
Attorneys.

Patented Dec. 5, 1939

2,182,469

UNITED STATES PATENT OFFICE 2,182,469

FLOAT BOX

George C. Davis, Chicago, Ill., assignor to Davis Regulator Company, Chicago, Ill., a corporation of Illinois Application October 24, 1938, Serial No. 236,620

2 Claims. (Cl. 73—317)

My invention relates to improvements in float boxes and indicator operating and controlling mechanisms and the like associated therewith, and has for one object to provide, especially in connection with high pressure liquid containing systems, delicate, accurate control means responsive to variations in conditions within the system and especially responsive to variations in liquid level in the system.

Another object of the invention is to provide means whereby, a magnetic field, power transmission apparatus, may be used to transmit power impulses from the interior of, to the outside of a high pressure system independent of and without the need of mechanical connection and packing between the inside and outside.

Other objects will appear from time to time in the course of the specification and claims.

My invention is illustrated more or less diagrammatically in the accompanying drawings, wherein—

Figure 3 is a section along the line 3—3 of Figure 1;

Figure 4 is a front elevation of the device showing diagrammatically an indicating mechanism;

Figure 5 is a vertical section of a modified form of my device.

Like parts are indicated by like characters throughout the specification and drawings.

Figure 1:
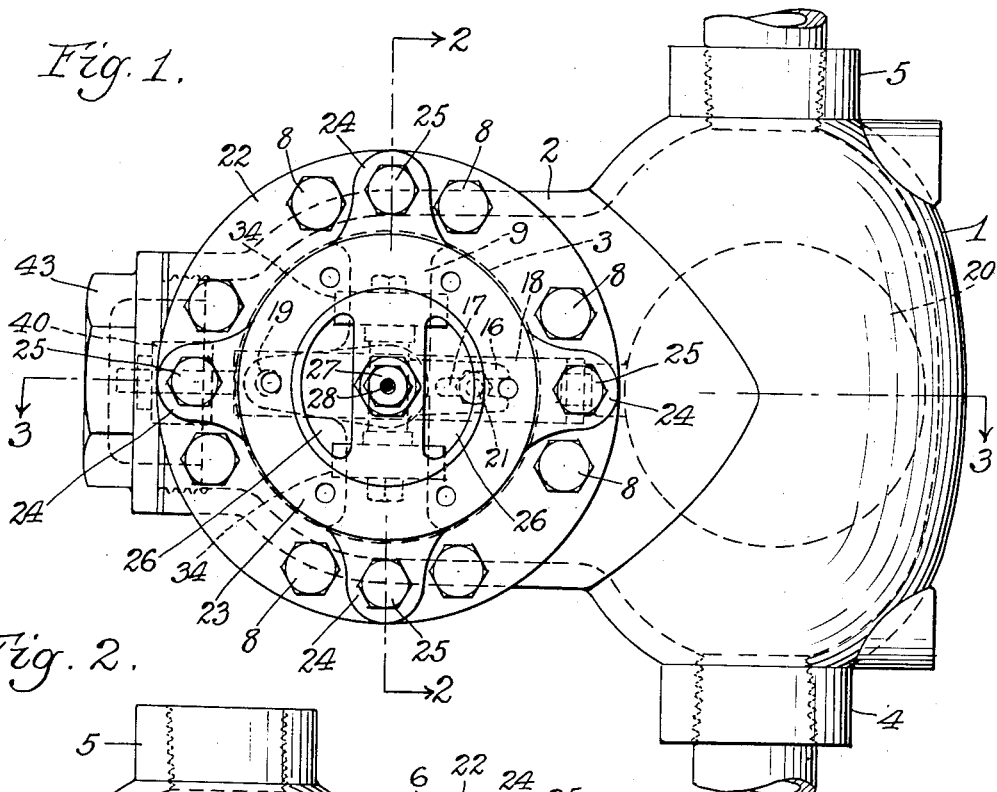
Figure 1 is a side elevation of my device.
Figure 2:
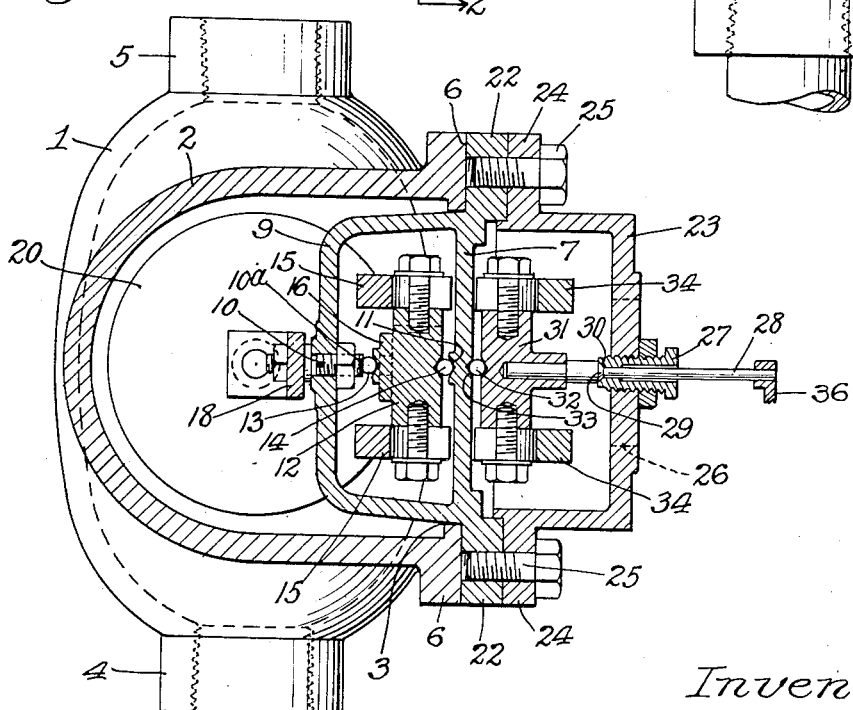
Figure 2 is a section along the line 2—2 of Figure 1.

1 is a float chamber. It has a lateral extension 2 which is apertured at 3. 4, 5 are apertured sleeves integral with the float chamber through which it may be connected by piping or other means to any high pressure liquid containing system as desired. The aperture 3 is bounded by an annular wall 6, and the aperture is adapted to be hermetically sealed by a partition wall 7. This partition wall is made of non-magnetic material, brass, bronze, copper or the like, and is held in hermetically tight sealing relationship with the annular wall 6, by bolts 8. When these bolts are released, the whole assembly, which will hereinafter be described, may be disconnected and withdrawn from the float chamber as a unit.

Projecting inwardly into the float chamber extension 2, is a yoke or bracket 9, which is integral with the partition 7. 10 is an adjustable pin having a spherical bearing 10a carried by the bracket, and 11, a spherical bearing in line therewith carried by the partition 7. 12 is a rotor. It has bearing balls 13 and 14 engaging the spherical bearings 10a and 11. Arranged about the periphery of the rotor are a plurality of fixed magnets 15. These are preferably U-magnets and their poles are in immediate juxtaposition to abut out of contact with the partition 7. 16 is a rotor lever mounted for rotation with the rotor 12. It is slotted at 17. 18 is a float lever pivoted at 19 on the yoke 9, extending across the end of the pivot pin 10, inwardly toward the float chamber where it carries a float 20. 21 is a drive pin on the lever 18 engaging the slot 17, so that as the liquid level in the float chamber varies and the float 20 moves up and down, the angular displacement of the float lever causes angular displacement of the rotor lever. The relative mechanical advantage may be adjusted by mounting the rotor lever so that it extends toward or away from the pivot axis of the float lever as desired.

Mounted on the flange 22, which encircles and is integral with the partition 7 and engages the wall or surface 6, is a housing 23 held thereupon by means of lugs 24 and cap screws 25. This housing 23 may be substantially continuous or only an open frame as the case may be. This frame or housing may if desired be apertured at 26, and it carries threaded therein an adjustable sleeve bearing 27. Through this bearing 27 passes a shaft 28 having a shoulder 29, engaging a thrust pin surface 30 formed on the end of the bearing. The shaft 28 carries a rotor 31. The rotor has a ball bearing 32 engaging a spherical bearing 33 on the outer side of the partition 7, in line with the pivot pin 10. The bearing arrangements for both rotors are the same. The rotors are adjustable toward the partition, the ball bearing associated with each rotor limiting movement toward the partition so that the magnets 15 on the rotor 12 and the magnets 34 on the rotor 31, may be maintained in proper position in immediate juxtaposition to the partition 7, but prevented from touching that partition.

The shaft 28 may be used to operate any suitable control or indicating mechanism. I have shown it diagrammatically as operating an indicating finger 35 and by a toggle mechanism 36 operating a valve 37, though any suitable means or mechanisms to be operated by the rotation of the shaft 28 may be used.

When the magnets 15 are caused to rotate about the axis of rotation defined by the central axis of the rotor 12, the lines of force associated with their poles travel with the magnets. The non-magnetic partition 7 offers no material opposition to the displacement of the lines of force or magnetic field and so a magnetic material upon the outside of the partition 7, will tend to be drawn in the same direction as the magnets 15. There is always a certain amount of lag, however, in this effect, because until the magnetic field has traveled an appreciable distance, the objects in the field will not be sufficiently acted upon by the lines of force to overcome resistance to movement. The same is true of the opposed electromagnets. In order to overcome this difficulty, and get quick and accurately controlled response, I stagger the fixed magnets in the two groups so that some of the magnets in one group are displaced in one direction, and other of the magnets in the same group are displaced in the opposite direction with respect to the magnets in the opposed group. The result is that while these magnets work against each other to some extent, that counter effect is balanced, but the system is, so to speak, under tension and when movement of the inner magnet carrying rotor takes place the outer magnet carrying rotor immediately follows in the same direction and the same distance.

In view of the fact that the liquid, the level of which is to be controlled or measured or indicated, may under some circumstances vary, it is desirable to provide means to adjust my apparatus to variable specific gravities and I do this by means of a counterweight 40, threaded on a screw 41, on the end of the lever 18. A lock nut 42 may be used to lock the counterweight in place. Access to the counterweight is obtained by removing the threaded cap 43, which closes an aperture in the housing 2, through which the counterweight may project and through which access to it may be had.

In the modified form of my device I have shown in Figure 5, 50 is a non-magnetic tube connected at the bottom by means of a pipe 51 to a tank 52, connected at the top by means of a pipe 53, to the tank 52 above the liquid level therein. 54 is a float within the tube, the specific gravity being such that it floats on the level of the liquid contained within the tube. 55 is a permanent magnet carried by the float. 56 is a ring encircling the tube on the outside. 57 is an elevation scale adjacent the tube.

As the water level in the tank changes, the level in the tube changes with it. The float travels up and down with the liquid level and the ring encircling the tube and supported only by the magnetic field of force of the magnet rides up and down the outside of the tube in consonance with the movement of the float and magnet. A gauge adjacent the tube furnishes a background against which the ring may be observed to determine the height of level of the liquid in the tank.

I claim:

1. In combination, an apertured float housing, a relatively stiff heavy non-magnetic imperforate closure for the aperture, a bearing frame projecting inwardly from the closure, bearings on the closure and the frame, a rotor mounted in said bearings, a fixed magnet carried by the rotor, a float lever pivoted on the frame on an axis out of line with the axis of rotation of the rotor, a float carried by the lever, a lever projecting from the rotor and a slidable, rotatable driving connection between the two levers, a frame projecting outwardly from the closure, a second set of bearings on the closure and said outwardly projecting frame, a second rotor mounted in said second set of bearings, a fixed magnet on said second rotor in opposition to the magnet on the first mentioned rotor and indicating means associated with the second rotor.

2. In combination, an apertured float housing, a relatively stiff heavy non-magnetic imperforate closure for the aperture, a bearing frame projecting inwardly from the closure, bearings on the closure and the frame, a rotor mounted in said bearings, a fixed magnet carried by the rotor, a float lever pivoted on the frame on an axis out of line with the axis of rotation of the rotor, a float carried by the lever, a lever projecting from the rotor and a slidable, rotatable driving connection between the two levers, a frame projecting outwardly from the closure, a second set of bearings on the closure and said outwardly projecting frame, a second rotor mounted in said second set of bearings, a fixed magnet on said second rotor in opposition to the magnet on the first mentioned rotor and indicating means associated with the second rotor, the closure having a flange, the frame member which projects inwardly from the closure being integral with the closure, the frame projecting outwardly from the closure being flanged to overlie the flange on the closure whereby the closure, the two frames, the two rotors and the float lever may be inserted and withdrawn from their relationship to the housing as a unit.

GEORGE C. DAVIS.